Oct. 27, 1953     J. A. LOVINGTON     2,657,004
VALVE WITH TWISTABLE SLEEVE
Filed July 11, 1949
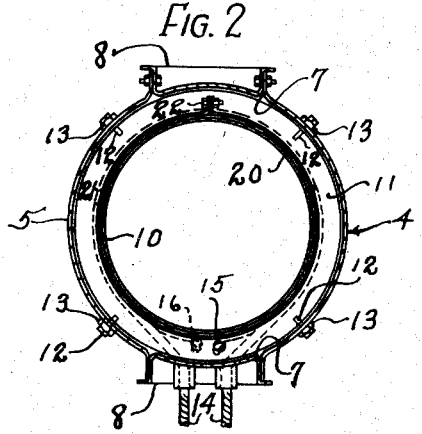
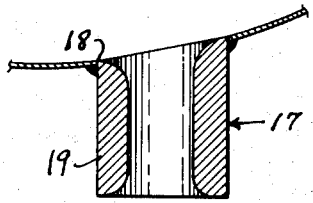
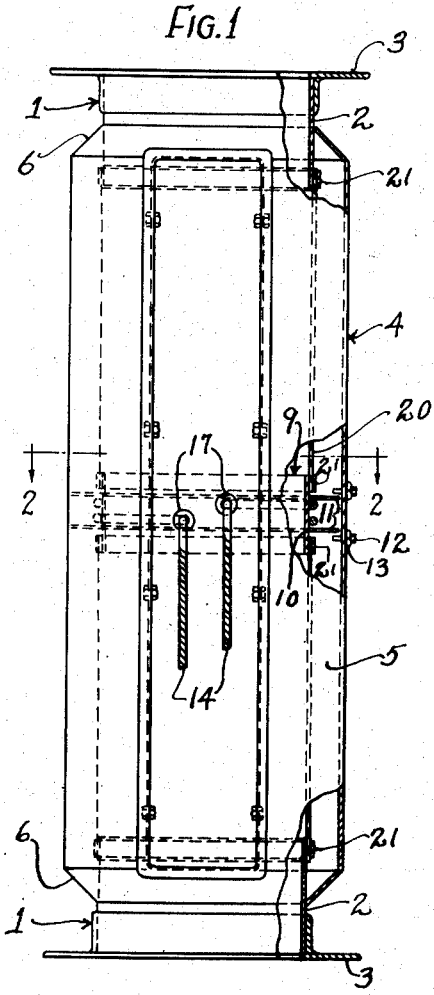
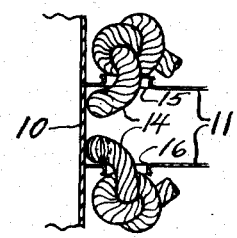
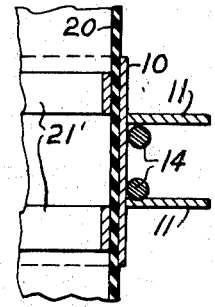
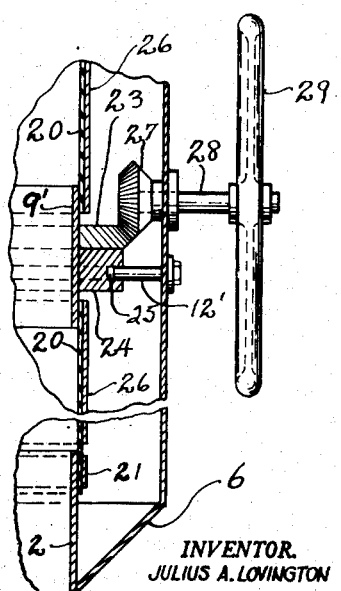
INVENTOR.
JULIUS A. LOVINGTON
BY George H. Mortimer
Attorney Patented Oct. 27, 1953

2,657,004

UNITED STATES PATENT OFFICE 2,657,004

VALVE WITH TWISTABLE SLEEVE

Julius A. Lovington, Rutherford, N. J.

Application July 11, 1949, Serial No. 104,064

13 Claims. (Cl. 251—5)

The present invention relates to a dust tight gate or valve adapted to be used in a conduit which carries dusty material.

In many industries pulverulent material is conveyed or run through conduits. Many different types of valves and gates have been proposed for use in such conduits but none of them has proved to be entirely satisfactory. Those having sliding parts exposed to the materials are subject to extreme wear and often are prevented from operating by accumulating of powder in guides, etc. Others have leaked dust into the atmosphere. The present invention overcomes these disadvantages of prior devices and provides a gate or valve which is dust tight, which has all operating parts outside the conduit through which the material flows and which is capable of shutting off the conduit completely. The structure and advantages of the present invention will become apparent from the detailed description of the structure and operation which follows, taken in conjunction with the drawing, in which:

Fig. 1 is an elevation, with parts in section, of an embodiment of the invention;

Fig. 2 is a section on the line 2—2 of Fig. 1;

Fig. 3 is a detail of an eye for the pull cord used in Fig. 1;

Fig. 4 is a detail showing the anchorage for the pull cord;

Fig. 5 is a fragmentary section of a modified embodiment of the invention; and

Fig. 6 is a fragmentary section of a further modified embodiment thereof.

The valve constructed in accordance with the invention comprises two spaced end sections secured in fixed relation to each other, each of which has an opening, and preferably is of annular shape. A flexible sleeve is secured to the end sections to form with the openings a passage through the valve. Means are secured to the sleeves intermediate its ends and mounted for rotation relative to the end sections about the axis of the sleeve so that the sleeve can be twisted about its axis to close the passage through it. A center section, also preferably annular in shape, is illustrative of such means. Annular end sections are preferably secured in spaced parallel planes with the center section mounted between them for rotation relative thereto with the openings in said end and center sections aligned on a common axis about which the center section is rotatable. While the valve may be used in a conduit carrying any flowable material, it has particular utility as a dust tight gate for conduits carrying solid powders and the following specific description relates to such a gate.

Referring now to Fig. 1, the gate comprises two end sections 1 each of which has a tubular portion 2 and a flange 3 which is adapted to be bolted to a similar flange (not shown) on the ends of the conduit in which the gate is to be used. It will be understood that any other suitable way of securing the gate in the conduit may be used instead of the flange.

A housing 4, which has a tubular portion 5 and sloping ends 6, is secured by these ends 6 to the tubular portions 2 of the end sections 1 intermediate the ends thereof as seen in Fig. 1. The housing is provided with openings 7 and doors 8 which permit access to the interior.

A center section 9 is rotatably mounted in housing 4. It has a tubular portion 10 and a pair of flanges 11 extending outwardly almost to the wall 5 in which are secured pins 12 above and below the flanges 11 as seen in Fig. 1. There are several such pins around the circumference, as seen in Fig. 2, and they serve to position the center section against axial movement while permitting it to rotate about its axis. Nuts 13 are shown to lock the pins in position and if desired the pins may carry rollers to reduce friction when the center section is rotated.

Two different means are shown for rotating the center section. In the modification of Figs. 1 to 4 pull cords 14 are used which are fastened at their inner ends to flanges 11 and they extend in opposite directions at least partially around the center section. One way of anchoring the inner ends is illustrated in Fig. 4 in which the upper flange 11 is provided with a hole 15 through which the end of the cord is passed upwardly and knotted. The lower flange 11 is similarly provided with a hole 16 through which the end of the cord is passed downwardly and knotted. The other ends of the cords pass outwardly through eyes 17 in the housing. Fig. 3 shows a suitable construction to minimize wear on the cords. The housing has two such eyes, one for each cord, and the eye includes a thimble or tube rounded internally at its ends and welded or otherwise secured to the rim of an opening 18 in the housing wall.

The center section is connected to each end section by a flexible tube 20, preferably made of rubber, which may be a single length (Fig. 6) or divided at the center (Figs. 1 and 5). A convenient way of fastening the sections to the rubber tube or sleeve is by means of split external bands 21 with bolts 22 for pulling them tight as shown in Figs. 1, 2 and 5, or similar internal bands 21' as shown in Fig. 6. This construction provides a continuous passage practically uniform in cross section from end to end without any openings for leakage of dust.

In the modification of Fig. 5 the end sections, the housing and the rubber tubes are the same as described but the center section 9' is provided with a ring gear 23 and a ring guide 24 which has a groove 25 cooperating with pins 12' to mount the same rotatably in the housing but held against axial movement. In this modification also there is a retaining sleeve 26, preferably of metal, which closely embraces the rubber sleeve 20 and extends substantially from the end sections to the center section. These retaining sleeves may be part of the ring clamp 21 or a separate part which is secured to one or the other of the ring clamps for the particular rubber sleeve. This structure is of utility when very heavy powders, e. g., cement, is being conveyed through a tube which is on a slope since it prevents a surge of material from distorting the rubber tube and blocking the passage. Rotation of center section 9' is effected by means of a pinion 27 engaged with ring gear 23 and fixed on a shaft 28 journaled in the housing. The shaft 28 may be rotated by any desired means, a hand wheel 29 being shown but power means may be used.

The operation of the gate is simple. When the gate is to be open for free passage of powdered material, the center section is turned so that the rubber tubes 20 are untwisted and in the form illustrated in the drawing. To throttle the flow, the center section is turned to twist the tubes 20 and thereby narrow the passage to the desired amount and by continuing the rotation of the center section the twist finally suffices to close the passage completely.

Although the device of the invention has been described in connection with certain preferred embodiments, it will be understood that modifications and variations in structure and use may be made without departing from the spirit of the invention or the scope thereof as defined in the appended claims. In particular the device may be used in conduits for fluids as well as powdered solids.

What is claimed is:

1. A valve comprising two spaced end sections secured in fixed relation to each other, each end section having an opening, a flexible sleeve secured to said end sections and forming with said openings a passage through said valve, and means secured to said sleeve intermediate the ends of said sleeve mounted for rotation relative to said ends about the axis of said sleeve for twisting the sleeve about the axis of the sleeve to close the passage therethrough.

2. A dust tight gate comprising two annular end sections secured in spaced substantially parallel planes, a flexible sleeve secured to said end sections, and means secured to said sleeve intermediate the ends of said sleeve mounted for rotation relative to said end sections about a common axis of said end sections for twisting the sleeve about an axis normal to said planes to open and close the passage therethrough.

3. A dust tight gate comprising a pair of spaced end sections adapted to be secured in fixed position in a conduit, a center section mounted for relative rotation to said end sections about a common axis to said end sections, said end sections and center section having aligned openings on said common axis, a flexible sleeve secured to said end sections and to said center section, said sleeve with said openings forming a passage through said gate, and means for rotating the center section relative to said end sections about said common axis to twist said flexible sleeve for opening and closing the passage therethrough.

4. A valve comprising two annular end sections aligned on a common axis, an annular center section mounted for rotation between and relative to said end sections about said common axis, a flexible tube secured to each end section and to said center section, and means for rotating said center section relative to said end sections about said common axis.

5. A valve adapted for use in a conduit carrying pulverulent material comprising in combination a pair of end sections adapted to be secured in fixed position in said conduit, said end sections having openings aligned on a common axis, a center section mounted for rotation about said common axis between and relative to said end sections and having an opening aligned with the openings in said end sections, a flexible sleeve secured at one end to one of said end sections and at the other end to said center section, and a flexible sleeve secured at one end to the other end section and at the other end to said center section, whereby rotation of said center section relative to said end sections twists said flexible sleeves to close the valve and vice versa.

6. A dust tight gate comprising a pair of flanged tubular end sections adapted to be secured in a conduit for dusty material, means extending between said end sections securing them in spaced relationship with said tubular end sections aligned on a common axis, an annular center section mounted in said means for rotation relative to said end sections about said common axis, means for rotating said center section, and a rubber tube secured to each end section and to said center section.

7. A dust tight gate comprising a pair of spaced end sections, said end sections having aligned openings on a common axis, a housing secured to and extending between said end sections, a rubber sleeve secured to said end sections within said housing and forming with said openings a passage through said gate, and means secured to said sleeve intermediate the ends of said rubber sleeve mounted for rotation relative to said end sections about said common axis for twisting the sleeve to close the passage therethrough.

8. A dust tight gate comprising a housing, an end section secured to each end of said housing, said end sections having aligned openings on a common axis, a center section mounted in said housing for relative rotation to said end sections about said common axis and having an opening aligned with the openings in said end sections on said common axis, means for rotating said center section relative to said end sections about said common axis, and a flexible sleeve secured to each end section and to said center section within said housing and forming with said openings a passage through said gate, said passage being adapted to be opened and closed by rotation of said center section relative to said end sections.

9. A dust tight gate as set forth in claim 8 in which the means for rotating said center section comprises a pair of pull cords anchored at one end to said center section and extending outside said housing after passing at least partially around said center section.

10. A dust tight gate as set forth in claim 8 in which the means for rotating said center section comprises a ring gear mounted on the center section, a pinion engaging the ring gear and means for rotating said pinion.

11. A valve comprising end sections having circular openings, means securing said end sections in fixed spaced relation to each other with said openings aligned on a common axis, a center section having a circular opening mounted for rotation between and relative to said end sections about said common axis, a rubber tube secured to each said end section and to said center section and forming with said openings a passageway through said valve, and means for rotating said center section relative to said end sections to open and close said passageway by untwisting or twisting said rubber sleeve about said axis.

12. A valve as set forth in claim 11 having a metallic retaining sleeve closely surrounding said rubber sleeve in open position.

13. A valve comprising means forming a passageway therethrough; a member mounted in said means between the ends of said passageway for rotation relative to said ends about the axis of said passageway; said member having an opening forming part of said passageway; a flexible sleeve secured at one end to said means on one side of said member, at the other end to said means on the other side of said member, and intermediate its ends to said member; and means for rotating said member relative to said means for twisting the intermediate portion of said sleeve relative to its ends about said axis and thereby to control the opening and closing of said passageway.

JULIUS A. LOVINGTON.

References Cited in the file of this patent

UNITED STATES PATENTS

| Number | Name | Date |
| --- | --- | --- |
| 1,831,488 | Flesher | Nov. 10, 1931 |
| 1,986,484 | Schlueter | Jan. 1, 1935 |
| 2,112,592 | MacClatchie | Mar. 29, 1938 |
| 2,416,391 | Hixson | Feb. 25, 1947 |
| 2,434,835 | Colley | Jan. 20, 1948 |